US009790299B2

(12) United States Patent
Thakare et al.

(10) Patent No.: US 9,790,299 B2
(45) Date of Patent: Oct. 17, 2017

(54) PROCESS OF POLYMERIZATION OF PROPYLENE

(71) Applicant: Reliance Industries Limited, Mumbai (IN)

(72) Inventors: Yogeshwar Narayanrao Thakare, Amravati (IN); Virendrakumar Gupta, Navi Mumbai (IN)

(73) Assignee: RELIANCE INDUSTRIES LIMITED, Mumbai, Maharashtra (IN)

( * ) Notice: Subject to any disclaimer, the term of this patent is extended or adjusted under 35 U.S.C. 154(b) by 238 days.

(21) Appl. No.: 14/441,380

(22) PCT Filed: Nov. 6, 2013

(86) PCT No.: PCT/IN2013/000684
§ 371 (c)(1),
(2) Date: May 7, 2015

(87) PCT Pub. No.: WO2014/073000
PCT Pub. Date: May 15, 2014

(65) Prior Publication Data
US 2015/0266982 A1 Sep. 24, 2015

(30) Foreign Application Priority Data
Nov. 8, 2012 (IN) .......................... 3250/MUM/2012

(51) Int. Cl.
*C08F 110/06* (2006.01)

(52) U.S. Cl.
CPC ........ *C08F 110/06* (2013.01); *C08F 2410/01* (2013.01); *C08F 2410/04* (2013.01)

(58) Field of Classification Search
CPC .................................................... C08F 110/06
See application file for complete search history.

(56) References Cited

U.S. PATENT DOCUMENTS

| 4,921,920 | A | 5/1990 | Collomb-Ceccarini et al. |
| 6,395,670 | B1 | 5/2002 | Morini et al. |
| 6,437,061 | B1 | 8/2002 | Sacchetti et al. |
| 6,686,307 | B2 | 2/2004 | Sacchetti et al. |
| 7,264,074 | B2 | 9/2007 | Jennings |
| 7,307,035 | B2 | 12/2007 | Sacchetti et al. |
| 7,482,413 | B2 | 1/2009 | Morini et al. |
| 2003/0050184 | A1 | 3/2003 | Job |
| 2004/0162401 | A1 | 8/2004 | Gray et al. |
| 2011/0054129 | A1 | 3/2011 | Gupta et al. |

FOREIGN PATENT DOCUMENTS

| IN | 1981/MUM/2010 | 7/2011 |
| WO | 2004/085495 A1 | 10/2004 |
| WO | 2012/007963 A2 | 1/2012 |

OTHER PUBLICATIONS

International Search Report issued in PCT/IN2013/000684 dated Jan. 4, 2014 (2 pages).

(Continued)

*Primary Examiner* — Catherine S Branch
(74) *Attorney, Agent, or Firm* — Gottlieb, Rackman & Reisman, P.C.

(57) ABSTRACT

The present disclosure provides a ziegler-natta pro-catalyst composition for the polymerization of propylene to produce polypropylene with reduced polymer-fines.

18 Claims, 1 Drawing Sheet

(56) References Cited

OTHER PUBLICATIONS

Li Wang, Preparation of Novel MgCl 2-Adduct Supported Spherical Ziegler-Natta Catalyst for α-Olefin Polymerization; Journal of Applied Polymer Science, vol. 99, 945-948 (2006); copyright 2005 Wiley Periodicals, Inc.; [State Key Laboratory of Polymer Reaction Engineering, College of Materials Science and Chemical Engineering, Zhejiang University, Hangzhou 310027, People's Republic of China; Received Jan. 26, 2005; accepted May 26, 2005; DOI 10.1002/app.22332; Published online in Wiley InterScience (www.interscience.wiley.com)].

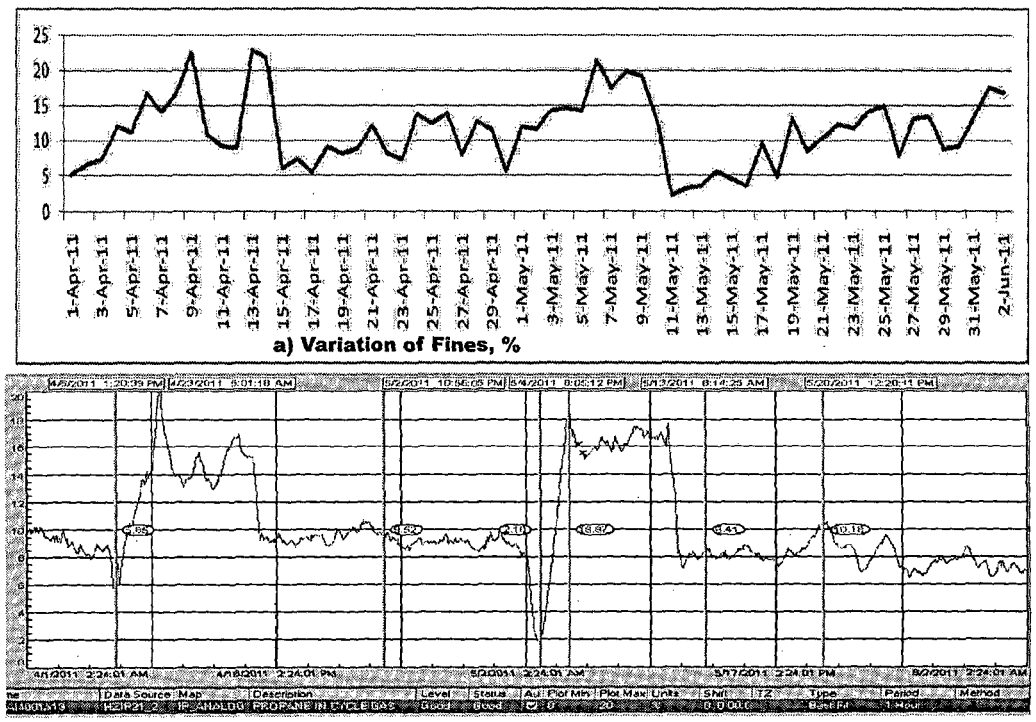
a) Variation of Fines, %
b) Variation of Propane, %

PROCESS OF POLYMERIZATION OF PROPYLENE

CROSS REFERENCE TO RELATED APPLICATIONS

This application claims priority to International Application PCT/IN2013/000684, filed on Nov. 6, 2013, which claims the benefit of Indian Patent Application No. 3250/MUM/2012, filed on Nov. 8, 2012. All of these applications are incorporated by reference in their entirety.

FIELD OF THE DISCLOSURE

The present disclosure relates to a catalyst composition for the polymerization of propylene and a process for preparation thereof. The present disclosure further relates to a process for the polymerization of propylene to obtain polypropylene having reduced polymer-fines and improved flowability.

BACKGROUND

Gas phase polymerization of propylene is one of the most widely accepted commercial processes, usually carried out in the presence of titanium-magnesium based ziegler-natta catalysts. The use of Ziegler-natta catalysts provides polymers/polyolefins with broad particle size distribution (100-5000 μm). The catalyst attrition during the polymerization process is predominantly responsible for the broad particle sizes distribution of polymers. The polymerization catalyst disintegrate during the polymerization process as the forces of the growing polymer chains fragment the catalyst. Each of the polymer fragments imprisons the catalyst fragment within itself and further grows in the reactor. Therefore, shape regularity and size distribution of polymer particles are directly related with the shape and size distribution of catalyst particles.

The controlled particle size distribution and shape regularity of polymer particles with reduced contents of polymer-fines is particularly desired for smoother plant operation and better throughput.

EXISTING KNOWLEDGE

In the polymerization prior-art, different approaches are adapted to provide ziegler-natta catalyst composition having controlled particle size distribution for the polymerization of olefins to produce polyolefins having reduced polymer-fines. The main approach for preparing catalysts with controlled particle size distribution and regular shape is to use regular shaped precursors in the catalyst preparation and to further retain the morphology of the precursor throughout the pro-catalyst synthesis process and polymers.

Usually, magnesium containing precursors with spherical morphology are treated with a titanium compound along with an internal donor, optionally in the presence of a hydrocarbon solvent, to provide an attrition resistance catalyst. For example, in the processes as disclosed in U.S. Pat. No. 6,437,061, U.S. Pat. No. 6,395,670, U.S. Pat. No. 6,686,307, Wo2004085495 and U.S. Pat. No. 7,482,413, spherical magnesium dichloride/alcohol adduct is treated with a titanium compound in the presence of an internal electron donor to provide catalyst composition with controlled morphology and particle size distribution. All the forgoing patents/patent applications disclose the charging of pro-catalyst precursors at 0° C. or below, to prevent sudden reaction and breakage of spherical precursor particles.

Similarly, U.S. Pat. No. 7,265,074 discloses a process for preparing attrition resistance catalyst by reacting a magnesium containing precursor with titanium tetrahalide/haloalkoxo species, internal electron donor and acid halide, in the presence of a hydrocarbon/halohydrocarbon solvent, under microwave irradiation of 300 to 1200 W.

The catalyst attrition is also prevented by addition of a third component such as ester during the synthesis of a pro-catalyst precursor, as disclosed in JAPS, Vol. 99, 945-948 (2006), or by incorporating small amount of elements selected from the group of lanthanide or actinide, as disclosed in U.S. Pat. No. 7,307,035.

US20110054129 discloses a process for preparing spheroidal magnesium alkoxide having improved mechanical strength and narrow particle size distribution. For this, magnesium metal is reacted with mixture of alcohols, in the presence of iodine, under heating at different rates in different time intervals. Indian Patent No. 1981/MUM/2010 discloses the use of solvent in the ratio of 0.4 to 2.5 for preparing attrition resistant catalyst, which provides improved surface area.

Despite of advances that are continuously being made over a period of time to reduce the generation of polymer-fines during the polymerization of olefins, there still remains a need to provide an improved catalyst composition for the polymerization of olefin to produce polyolefin having reduced polymer-fines.

OBJECTS

Some of the objects of the present disclosure are discussed herein below.

It is an object of the present disclosure to ameliorate one or more problems of the prior art or to at least provide a useful alternative.

Another object of the present disclosure is to provide a catalyst composition for the polymerization of olefin to produce polyolefin having controlled particle size distribution and reduced polymer-fines.

Still another object of the present disclosure is to provide a catalyst composition for the polymerization of olefin to produce polyolefin; the catalyst being employed is of optimized composition, and having controlled catalyst particle size distribution and regular shape.

A yet another object of the present disclosure is to provide polyolefin having controlled particle size distribution and reduced content of polymer-fines.

A further object of the present disclosure is to provide polyolefin having good flowability which further results in improved plant throughput.

A still further object of the present disclosure is to provide a process for the polymerization of olefin to obtain polyolefin having reduced polymer fines; the reduced generation of polymer-fines is accomplished by employing a catalyst with optimized composition, and controlled particle size distribution and shape.

A yet further object of the present disclosure is to provide a process for the polymerization of olefin to obtain polyolefin having reduced content of polymer-fines wherein the generation of polymer-fines is continuously monitored and controlled through related process parameters.

Other objects and advantages of the present disclosure will be more apparent from the following description when read in conjunction with the accompanying FIGURES which are not intended to limit the scope of the present disclosure.

DEFINITIONS

The term "catalyst" or "catalyst composition," as used in the context of the present disclosure refers to transition metal containing compounds, or mixtures thereof, that are useful in catalyzing the polymerization of olefin monomers.

The term "pro-catalyst" or "pro-catalyst composition" as used in the context of the present disclosure refers to a catalyst composition comprising the compounds of Ti, Mg, and optionally, an internal electron donor which is activated to an active polymerization catalyst either within the polymerization reactor during the polymerization process or in the stirred vessel prior to the polymerization reaction by an additional co-catalyst component.

The term "polymer-fines" as used in the context of the present discourse, refers to polymer having average particle size below 100 μm.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

SUMMARY

In accordance with the present disclosure there is provided a ziegler-natta pro-catalyst composition for the polymerization of propylene to produce polypropylene with reduced polymer-fines, comprising a reaction product of (i) at least one titanium compound of the molecular formula $TiX_n(OR^1)_{4-n}$, wherein n is an integer from 0 to 4, X is halogen, $R^1$ is independently selected from the group consisting of $C_1$ to $C_{10}$ alkyl group; (ii) at least one magnesium containing precursor of molecular formula $Mg(OR^2)(OR^3)$, wherein $R^2$ and $R^3$ are identical or different, and independently selected from the group consisting of $C_1$ to $C_{10}$ alkyl groups, $C_1$ to $C_6$ aryl group and $C_1$ to $C_{10}$ alkylaryl group; and (iii) at least one internal electron donor selected from the group of compounds consisting of dicarboxylic acid ester, monocarboxylic acid ester, diethers, silyl esters, amides, carbonates, and succinates; said pro-catalyst composition containing iron preferably below 100 ppm.

Typically, the titanium compound is selected from the group consisting of tetravalent titanium halides and titanium alkoxides.

Preferably, the titanium compound is titanium tetrachloride.

Typically, the magnesium containing precursor is selected from the group of compounds consisting of magnesium dialkoxides and magnesium diaryloxides.

Typically, the magnesium containing precursor is selected from the group consisting of magnesium methoxide, magnesium ethoxide, magnesium iso-propoxide, magnesium n-butoxide, magnesium phenoxide, and combinations thereof.

Typically, the internal electron donor is di-isobutyl phthalate

In accordance with another aspect of the present disclosure, there is provided a process for preparing a Ziegler-natta pro-catalyst composition, said process comprising the following step:

reacting at least one titanium compound of molecular formula $TiX_n(OR^1)_{4-n}$, wherein n is an integer from 0 to 4, X is halogen, $R^1$ is independently selected from the group consisting of $C_1$ to $C_{10}$ alkyl group with at least one magnesium containing precursor of molecular formula $Mg(OR^2)(OR^3)$, wherein $R^2$ and $R^3$ are identical or different, and independently selected from the group consisting of $C_1$ to $C_{10}$ alkyl group, $C_1$ to $C_6$ aryl group and $C_1$ to $C_{10}$ alkylaryl group, and at least one internal electron donor selected from the group of compounds consisting of dicarboxylic acid esters, monocarboxylic acid ester, diethers, silyl esters, amides, carbonates and succinates, optionally in the presence of an inert hydrocarbon solvent.

Typically, the titanium compound is selected from the group consisting of tetravalent titanium halides and titanium alkoxides.

Typically, the magnesium containing precursor is selected from the group of compounds consisting of magnesium dialkoxides and magnesium diaryloxides.

Typically, the amount of iron in magnesium containing precursor ranges between 50 and 160 ppm, preferably between 50 ppm and 100 ppm.

Typically, the inert hydrocarbon solvent is selected from the group consisting of halohydrocarbons.

In accordance with the present disclosure there is also provided a catalyst composition with controlled particle size distribution and regular shape, comprising; (i) a pro-catalyst composition containing iron preferably below 100 ppm, as claimed in claim 1; (ii) trialkyl aluminum as a co-catalyst; and (iii) optionally, at least one external electron donor selected from the group of silanes, alkoxy silanes, alkyl silane, alkyl alkoxy silane and aliphatic/aromatic ester.

Typically, the co-catalyst and, the pro-catalyst are present in the molar ratio ranging between 1:30 and 1:100.

Typically, the co-catalyst and the external electron donor are present in the molar ratio ranging between 1:1 and 1:40.

In accordance with still another aspect of the present disclosure there is provided a process for the polymerization of propylene in the presence of a catalyst composition containing iron preferably below 100 ppm, said process comprises contacting propylene monomers with the catalyst composition, in a gas-phase fluidized bed reactor, under the polymerization condition of temperature ranging between 65° C. and 75° C. and pressure ranging between 25 kg/cm² and 35 kg/cm², to obtain polypropylene having controlled particle size distribution and reduced polymer-fines.

Typically, the co-catalyst and the pro-catalyst component are present in the molar ratio ranging between 1:30 and 1:100.

Typically, the co-catalyst and the external electron donor are present in the molar ratio ranging between 1:1 and 1:40.

In accordance with yet another aspect of the present disclosure there is provided the polypropylene having controlled particle size distribution and reduced polymer fines prepared in accordance with the process of the present disclosure; said polypropylene being characterized by having average particle size ranging between 350 and 700 micron and bulk density ranging between 0.3 and 0.6 gm/cc.

The polypropylene having controlled particle size distribution and reduced polymer fines prepared in accordance with the process of the present disclosure, wherein the amount of polymer fines having average particle size less than 100 μm is not more than 10%.

BRIEF DESCRIPTION OF THE ACCOMPANYING DRAWINGS

The FIGURE illustrates variation of Fines level in gas phase fluidized bed polymerization reactor with propane concentration, in accordance with the process of the present disclosure.

DETAILED DESCRIPTION

Accordingly, the inventors of the present disclosure envisage a titanium and magnesium containing catalyst for the polymerization of propylene to produce polypropylene with high average particle size and improved flow-ability. The herein described attributes of the polypropylene resin are significantly achieved by reducing the generation of polymer-fines during the polymerization of propylene, particularly during the gas phase polymerization of propylene. Apart from controlling the size distribution and shape of catalyst particles, during the preparation of a pro-catalyst and a catalyst composition, their compositional optimization is also accomplished in the present disclosure to significantly reduce the generation of polymer-fines.

The catalyst attrition is predominantly responsible for the generation of polymer-fines. Apart from the factors that are primarily responsible for catalyst attrition, the inventors of the present disclosure have surprisingly found out the production of propane as a side-product, during the polymerization of propylene, exaggerating the catalyst attrition. Accordingly, the inventors of the present disclosure emphasizes on controlling the concentration of propane during the polymerization of propylene to accomplish reduced generation of polymer-fines During gas-phase polymerization of propylene, the impurities, particularly iron present in the polymerization catalyst promotes hydrogenation of propylene to propane. The presence of hydrogen gas employed as a molecular weight control agent during the polymerization process enhances the propane production. For producing high melt flow index (MFI) polypropylene, higher hydrogen concentration is required, which results in generation of more propane as side-product, it may result in more fines in the polymerization reactor. Higher amount of propane generation while producing low MFI grades polypropylene is due to high amount of iron in the catalyst.

The mixture of propylene and propane gets condensed in the fluidized bed reactor thereby enhancing the heat removal rate while its vaporization. Therefore, the increased concentration of propane in the fluidized bed reactor leads to more condensation and consequently high heat removal rate. The higher heat removal rate increases the polymerization rate. The increased polymerization rate consequently leads to higher catalyst attrition.

Accordingly, a process for preparing polypropylene with reduced polymer-fines is provided in the present disclosure wherein the reduced generation of polymer-fines is accomplished by controlling the concentration of propane during the polymerization of propylene. The concentration of propane during the polymerization of propylene in accordance with the present disclosure is controlled by employing a polymerization catalyst containing iron in minimum amount. The present disclosure also provides a catalyst composition containing minimum amount of iron for the polymerization of propylene to produce polypropylene with reduced polymer-fines.

In accordance with a first aspect of the present disclosure, there is provided a titanium-magnesium containing pro-catalyst composition containing iron preferably below 100 ppm, for the polymerization of propylene to produce polypropylene with reduced polymer-fines.

The pro-catalyst composition in accordance with the present disclosure comprises a reaction product of at least one transition metal compound (component A) with at least one magnesium containing precursor (component B) and at least one internal donor (C) selected from the group of compounds consisting of dicarboxylic acid ester, monocarboxylic acid ester, diethers, silyl esters, amides, carbonates, succinates and the like. The transition metal compound i.e. component (A) in accordance with the present disclosure is preferably a titanium compound of the molecular formula $TiX_n(OR^1)_{4-n}$, wherein X is halogen, R is $C_1$-$C_{10}$ alkyl group, and n is an integer from 0 to 4. Typically, the titanium compound includes but is not limited to tetravalent titanium halides and titanium alkoxides. In accordance with one of the exemplary embodiment of the present disclosure, the tetravalent titanium compound is titanium tetrahalide. The preferred example is titanium tetrachloride ($TiCl_4$).

The magnesium containing precursor i.e. component (B), in accordance with the present disclosure is a magnesium alkoxide of the molecular formula $Mg(OR^2)(OR^3)$, wherein $R^2$ and $R^3$ are identical or different and independently selected from the group consisting of $C_1$ to $C_{10}$ alkyl group, $C_1$ to $C_6$ aryl group and $C_1$ to $C_{10}$ arylalkyl. Typically, the magnesium containing precursors are selected from the group consisting of magnesium dialkoxides and magnesium diaryloxides. The preferred and non-limiting examples of magnesium dialkoxides and magnesium diaryloxide include at least one selected from the group consisting magnesium diethoxide, magnesium dibutoxide, magnesiumdiisopropoxide, magnesium diphenoxide and the like. The particularly preferred is magnesium dialkoxide.

In another embodiment of the present disclosure, the magnesium containing precursors are selected from the group of compounds of the molecular formula $Mg(OR^2)_n X_m$, wherein X is halogen, particularly chlorine, $R^2$ is as defined in the above embodiment for $R^2$ and $R^3$, and n+m=2. The preferred example includes at least one selected from the group of compounds consisting of magnesium alkoxide.

The pro-catalyst composition containing iron preferably below 100 ppm is preferred in the present disclosure. The amount of iron in the pro-catalyst composition of the present disclosure is preferably customized, at the first stage, by employing a suitable catalyst precursor which reasonably contains lower percentage of iron impurities. Generally, the magnesium containing precursors are the rich source of iron. Consequently, the inventors of the present disclosure emphasizes on employing magnesium containing precursors containing iron, below certain pre-determined limit. Typically, the magnesium used for precursors containing iron in an amount ranging between 50 ppm to 160 ppm, preferably below 100 ppm are preferred.

In addition to employing the magnesium used for precursor containing iron preferably below 100 ppm, the second stage of optimization comprises the use of Teflon coated reactor material.

The internal electron donor i.e. component-C, in accordance with the present disclosure is selected from the group of compounds consisting organic di-carboxylic esters, monocarboxylic acid ester, diethers, silyl esters, amides, carbonates, succinates and the like. In accordance with one of the exemplary embodiments of the present disclosure, the internal donor is selected from the group consisting of dicarboxylic acid esters. Preferably, the internal donor used is di-isobutyl phthalate.

In accordance with the present disclosure, the proportion of Ti is about 10-15 moles per mole of Mg and the proportion of internal donor is about 0.1 to 0.3 moles per mole of Mg.

The pro-catalyst composition in accordance with the present disclosure may be prepared by employing any conventional methods known in the art. In accordance with a preferred method, the component (A) is reacted with the component (B) and the component (C), optionally, in the presence of an inert hydrocarbon solvent.

The inert hydrocarbon solvents which are suitable for the purpose of the present disclosure are halohydrocarbons which include at least one selected from the group consisting of chlorobenzene, o-dichlorobenzene, m-dichlorobenzene, p-dichlorobenzene, 1,2,4-trichlorobenzene, benzyl chloride, dichloromethane, dichloroethane, dibromoethane, bromobenzene, o-dibromobenzene, m-dibromobenzene, p-dibromobenzene and the like, preferably chlorobenzene.

In accordance with one of the exemplary embodiments, the component (A), particularly titanium tetrachloride, is dispersed in chlorobenzene under stirring to obtain a suspension. The titanium tetrachloride and chlorobenzene are preferably mixed in an equi-volume ratio. The suspension of the component (A) is then reacted with the component (B) either in a single step or a plurality of steps. Preferably, the reaction is a three step process. The component (C) which is internal electron donor selected from the group of compounds consisting organic di-carboxylic esters, monocarboxylic acid ester, diethers, silyl esters, amides, carbonates, succinates is added during the first step. The component (A) is reacted with the component (B) and the component (C) at a temperature varying between 40° C. to 120° C., preferably at 110° C. to obtain a solid ziegler-natta pro-catalyst composition. The solid pro-catalyst composition thus obtained is filtered and successively washed with an inert hydrocarbon solvent till a filtrate, free from any un-reacted materials, is obtained. Preferably, the solid pro-catalyst composition is washed four times with effective amount of iso-pentane and dried at 50° C. under stream of nitrogen.

In accordance with another aspect of the present disclosure there is provided a catalyst composition with controlled particle size distribution and regular shape, comprising; (i) a pro-catalyst composition containing iron preferably below 100 ppm (ii) trialkyl aluminum as a co-catalyst; and (iii) optionally, at least one external electron donor selected from the group of silanes, alkoxy silanes, alkyl silane, alkyl alkoxy silane and aliphatic/aromatic ester.

The co-catalyst and the pro-catalyst are present in the molar ratio ranging between 1:30 and 1:100. The co-catalyst and the external electron donor are present in the molar ratio ranging between 1:1 and 1:40.

The catalyst composition prepared in accordance with the process of the present disclosure is employed for the polymerization of olefins, particularly for the polymerization of propylene by using a gas-phase fluidized bed reactor. The gas-phase polymerization of propylene in accordance with the present disclosure is accomplished by employing any conventional methods known in prior-art. The particular preferred method comprises the polymerization of propylene monomers by contacting with the catalyst composition of the present disclosure in a 25 Kg/hr to 25 TPH gas phase fluidized bed reactor at a temperature varying between 60° C. to 80° C. and pressure varying between 25 kg/cm$^2$ to 35 kg/cm$^2$. In the fluidized bed reactor, a cycling gas stream (also refer as re-cycling gas stream or a fluidizing medium) is mixed with a fresh propylene stream and passed through the fluidized bed reactor through a distributor plate. The recycled gas stream acts as a fluidizing media for polypropylene resin and also aids in the better dispersion of the catalyst. The propylene gas stream mixed with the recycling gas stream is re-circulated through the bed and is cooled in an external heat exchanger, removing the heat of reaction. A cycle gas compressor is used in the re-circulation loop to overcome differential pressure.

The pro-catalyst composition prepared in accordance with the present disclosure is added to the gas-phase fluidized bed reactor preferably in the form of slurry. During the propylene polymerization, the pro-catalyst composition is combined with an organoaluminum compound as a co-catalyst. The co-catalyst is mixed with the pro-catalyst composition in the polymerization reactor during the polymerization process. Alternatively, the co-catalyst is mixed with the pro-catalyst composition prior to the polymerization reaction in a stirred reaction to obtain an activated catalyst composition. The catalyst composition thus obtained is then introduced in the polymerization reactor.

The organoaluminum compound in accordance with the present disclosure is preferably a trialkyl aluminum compound selected from the group, consisting of trimethyl aluminum, triethyl aluminum, tri-isopropyl aluminum, tri-isobutyl aluminum and combinations thereof. The co-catalyst and the pro-catalyst are present in the molar ratio ranging between 1:30 and 1:100.

Selectivity controlling agent is aliphatic organic silane compound such as diphenyldimethoxysilane, phenyltrimethoxysilane, phenylethyldimethoxysilane, phenylmetyldimethoxysilane, trimethylmethoxysilane, isobutyltrimethoxysilane, diisobutylmethoxysilane, dicyclopentyldimethoxysilane, di-t-butyldimethoxysilane, dicyclopentyldimethoxysilane, cyclohexylmethyldimethoxysilane, dicyclohexyldimethoxysilane and mixture thereof, preferably dicyclopentyldimethoxysilane. Selectivity controlling agent also consists of mixture esters and silane. It is added in the proportion depending on the intended application of resulting polypropylene. Particularly, the co-catalyst and the external electron donor are present in the molar ratio ranging between 1:1 and 1:40. The molar mass of polypropylene is controlled in a known manner, preferably by using a hydrogen gas. To have polymer with desired Melt Flow Index, certain hydrogen partial pressure is maintained in the fluidized bed reactor.

The polypropylene obtained in accordance with the present disclosure have controlled particle size distribution and reduced polymer fines and further characterized by having the average particle size ranging between 350 and 700 micron; bulk density ranging between 0.3 and 0.6 gm/cc;

and the amount of polymer fines having average particle size less than 100 μm is not more than 10%.

The generation of polymer-fines in the fluidized bed reactor during the polymerization process of the present disclosure is continuously monitored by monitoring propane concentration in the reactors. The results are shown in Table 2-5.

The polypropylene obtained in accordance with the process of the present disclosure contains very low contents of polymer-fines. The percentage of polymer-fines produced during the gas-phase polymerization process of the present disclosure is found to be directly related with the propane concentration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Example 1

This example describes a process for the preparation of a catalyst containing Ti, Mg and internal electron donor compound.

Magnesium alkoxide (2.2 Kmole) was treated with 12 Kmoles of TiCl4 diluted in equivalent volume of chlorobenzene at 110° C. The method step of treatment was repeated thrice. Di-iso butyl phthalate internal donor (0.15 Kmoles) was added in the first step whereas 0.1 Kmoles benzoyl chloride was added in the last step. After three stages of treatment, a solid pro-catalyst component was obtained, which was filtered and washed four times with equivalent volume of iso pentane. Subsequently, the pro-catalyst component was dried at 50° C. temperature under stream of nitrogen for getting final catalyst (CAT-1). In the process of this example, magnesium alkoxide having iron content of 160 ppm was employed.

Example-2 and 3

Similar to the process of example-1, two different catalyst compositions (CAT-2 and Cat-3) were prepared by using magnesium alkoxide having iron content of 70 ppm and 55 ppm, respectively. The analytical data of all the three catalysts i.e. CAT-1, CAT-2 and Cat-3 are provided herein below as follows:

Example 4

This example describes a process for the polymerization of propylene carried out in the presence of a pro-catalyst composition, prepared in accordance with the process of example-1. The polymerization of propylene was carried out in a 25 TPH (Tonnes per hour) gas phase fluidized bed reactor at 70° C. and 32 kg/cm² in the presence of a Ti—Mg containing catalyst having iron content of 205 ppm (CAT-1). The variation of fines level in the gas phase fluidized bed reactor with propane concentration were monitored and shown in Table 2.

TABLE 2

Variation of Fines level with propane concentration during the propylene polymerization carried out in the gas phase fluidized bed polymerization reactor by using CAT-1.

| Sr. No. | Propane concentration, % | Fines level, % |
|---|---|---|
| 1 | 6.9 | 11.0 |
| 2 | 7.6 | 16.2 |
| 3 | 7.4 | 9.5 |
| 4 | 9.4 | 11.2 |
| 5 | 8.9 | 13.9 |

Example-5

This example describes a process for the polymerization of propylene carried out by using catalysts prepared in accordance with the processes of examples-2 and 3. Variations of fines level with propane concentration in the gas phase fluidized bed polymerization reactor are shown in Table 3 and Table 4.

TABLE 3

Variation of Fines level with propane concentration in the gas phase fluidized bed polymerization reactor for CAT-2

| Sr. No. | Propane concentration, % | Fines level, % |
|---|---|---|
| 1 | 10.9 | 13.0 |
| 2 | 8.6 | 8.4 |
| 3 | 8.3 | 9.1 |
| 4 | 10.1 | 11.2 |
| 5 | 8.7 | 9.3 |

TABLE 1

Analysis of precursor, catalyst & resulting polymer product

| Sr. N | Catalyst Details | Magnesium ethoxide precursor ||||| Polymerization Catalyst |||||
|---|---|---|---|---|---|---|---|---|---|---|---|
| | | Iron, ppm | $D_{10}$ Mm | $D_{50}$ μm | $D_{90}$ μm | $D_{Mean}$ μm | Iron, ppm | $D_{10}$ μm | $D_{50}$ μm | $D_{90}$ μm | $D_{Mean}$ μm |
| 1 | CAT-1 | 160 | 12 | 28 | 41 | 26 | 205 | 6 | 25 | 51 | 28 |
| 2 | CAT-2 | 70 | 7 | 26 | 39 | 25 | 195 | 5 | 23 | 52 | 27 |
| 3 | CAT-3 | 55 | 4 | 19 | 34 | 18 | 90 | 2 | 21 | 23 | 19 |

TABLE 4

Variation of fines level with propane concentration in the
gas phase fluidized bed polymerization reactor for CAT-3

| Sr. No. | Propane concentration, % | Fines level, % |
|---|---|---|
| 1 | 6.2 | 3.8 |
| 2 | 6.7 | 7.3 |
| 3 | 6.6 | 8.3 |
| 4 | 7.6 | 8.8 |
| 5 | 6.9 | 9.4 |

Example-6

This example describes a process for the polymerization of propylene carried out by using a mixed catalyst composition comprising CAT-2 and CAT-3. The correlation between fines level and propane concentration is illustrated in FIG. 1 of the accompanying drawings. The illustrated FIGURE shows synchronized variation of fines with propane concentration. The data is for 3-25 g/10 Mins MFI grade polypropylenes.

Example-7

In the process of this example, polypropylene with two different MFI grades were produced i.e. 6 gm/10 min and 11 gms/10 minutes. The variations of fine levels with propane concentration for two different MFI grades polypropylene were studied. For 6 g/10 Mins MFI grade, the fines were found to be ranging from 5.2-7.3% and for 11 g/10 Mins MFI grade, fines were found to be ranging from 14.1-22.6%. The increase in reactor fines level was explained by increase in propane concentration from 9% to 11%.

TABLE 5

Variation of fines level as opposed to propane concentration
in gas phase fluidized bed polymerization reactor
for two grades of polypropylene.

| Sr. No. | Reactor MFI, g/10 min | Propane concentration, % | Fines level, % |
|---|---|---|---|
| 1 | 6 | 9.9 | 5.2 |
| 2 | 6 | 9.3 | 6.5 |
| 3 | 6 | 9.0 | 7.3 |
| 4 | 11 | 11.2 | 14.1 |
| 5 | 11 | 14.7 | 16.7 |
| 6 | 11 | 17.1 | 22.6 |

TECHNICAL ADVANTAGES

The present disclosure related to a catalyst composition for the polymerization of propylene to prepare polypropylene having higher particle size distribution and improved flow-ability, a process for preparation thereof, and a process for preparing polypropylene has technical advantages, described herein below as follows:

1. Improved catalyst particle size distribution,
2. Higher polymer particle size and its distribution,
3. Reduced generation of polymer-fines,
4. Improved plant operability since the reduced generation of polymer-fines gives good control over fluidized bed polymerization reactor,
5. Improved plant throughput, as polypropylene resin with higher particle size distribution allows to operate plant at higher reactor bed height,
6. Production of polypropylene with controlled particle size distribution and shape, and
7. Monitoring of polymer-fines by monitoring the propane production in the gas-phase fluidized bed reactor, which helps to take corrective action.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A Ziegler-Natta pro-catalyst composition for the polymerization of propylene to produce polypropylene with reduced polymer-fines, comprising a reaction product of (i) at least one titanium compound of the molecular formula $TiX_n(OR^1)_{4-n}$, wherein n is an integer from 0 to 4, X is halogen, $R^1$ is independently selected from the group consisting of $C_1$ to $C_{10}$ alkyl group; (ii) at least one magnesium containing precursor of molecular formula $Mg(OR^2)(OR^3)$, wherein $R^2$ and $R^3$ are identical or different, and independently selected from the group consisting of $C_1$ to $C_{10}$ alkyl groups, $C_1$ to $C_6$ aryl group and $C_1$ to $C_{10}$ alkylaryl group; and (iii) at least one internal electron donor selected from the group of compounds consisting of dicarboxylic acid ester, monocarboxylic acid ester, diethers, silyl esters, amides, carbonates, and succinates; said pro-catalyst composition containing iron ranging between about 50 ppm and 100 ppm.

2. The pro-catalyst composition as claimed in claim 1, wherein the titanium compound is selected from the group consisting of tetravalent titanium halides and titanium alkoxides.

3. The pro-catalyst composition as claimed in claim 1, wherein the titanium compound is titanium tetrachloride.

4. The pro-catalyst composition as claimed in claim 1, wherein the magnesium containing precursor is selected from the group of compounds consisting of magnesium dialkoxides and magnesium diaryloxides.

5. The pro-catalyst composition as claimed in claim 1, wherein the magnesium containing precursor is selected from the group consisting of magnesium methoxide, magnesium ethoxide, magnesium iso-propoxide, magnesium n-butoxide, magnesium phenoxide, and combinations thereof.

6. The pro-catalyst composition as claimed in claim 1, wherein the internal electron donor is di-isobutyl phthalate.

7. A process for preparing a Ziegler-Natta pro-catalyst composition as claimed in claim 1, said process comprising the following step;

reacting at least one titanium compound of molecular formula $TiX_n(OR^1)_{4-n}$, wherein n is an integer from 0 to 4, X is halogen, $R^1$ is independently selected from the group consisting of $C_1$ to $C_{10}$ alkyl group with at least one magnesium containing precursor of molecular formula Mg(OR2)(OR3), wherein $R^2$ and $R^3$ are identical or different, and independently selected from the group consisting of $C_1$ to $C_{10}$ alkyl group, $C_1$ to $C_6$ aryl group and $C_1$ to $C_{10}$ alkylaryl group, and at least one internal electron donor selected from the group of compounds consisting of dicarboxylic acid esters, monocarboxylic acid ester, diethers, silyl esters, amides, carbonates, and succinates optionally in the presence of an inert hydrocarbon solvent.

8. The process as claimed in claim 7, wherein the titanium compound is selected from the group consisting of tetravalent titanium halides and titanium alkoxides.

9. The process as claimed in claim 7, wherein the magnesium containing precursor is selected from the group of compounds consisting of magnesium dialkoxides and magnesium diaryloxides.

10. The process as claimed in claim 7, wherein the inert hydrocarbon solvent is selected from the group consisting of halohydrocarbons.

11. A catalyst composition with controlled particle size distribution and regular shape, comprising; (i) a pro-catalyst composition containing iron ranging between about 50 ppm and 100 ppm, as claimed in claim 1; (ii) trialkyl aluminum as a co-catalyst; and (iii) optionally, at least one external electron donor selected from the group of silanes, alkoxy silanes, alkyl silane, alkyl alkoxy silane, and aliphatic ester and aromatic ester.

12. The catalyst composition as claimed in claim 11, wherein the co-catalyst and the pro-catalyst are present in the molar ratio between 1:30 and 1:100.

13. The catalyst composition as claimed in claim 11, wherein the co-catalyst and the external electron donor are present in the molar ratio between 1:1 and 1:40.

14. A process for the polymerization of propylene in the presence of a catalyst composition containing iron ranging from between about 50 ppm and 100 ppm as claimed in claim 11, said process comprises contacting propylene monomers with the catalyst composition, in a gas-phase fluidized bed reactor, under the polymerization condition of temperature ranging between 65° C. and 75° C. and pressure ranging between 25 kg/cm² and 35 kg/cm², to obtain polypropylene having controlled particle size distribution and reduced polymer-fines.

15. The process as claimed in claim 14, wherein the co-catalyst and the pro-catalyst are present in the molar ratio between 1:30 and 1:100.

16. The process as claimed in claim 14, wherein the co-catalyst and the external electron donor are present in the molar ratio between 1:1 and 1:40.

17. The process as claimed in claim 14 wherein the polypropylene is characterized by having average particle size between 350 and 700 micron and bulk density between 0.3 and 0.6 gm/cc.

18. The process as claimed in claim 14, wherein the amount of polymer fines having average particle size less than 100 μm is not more than 10%.

* * * * *